C. J. KING, III
J. P. CLARK, III
INVENTORS

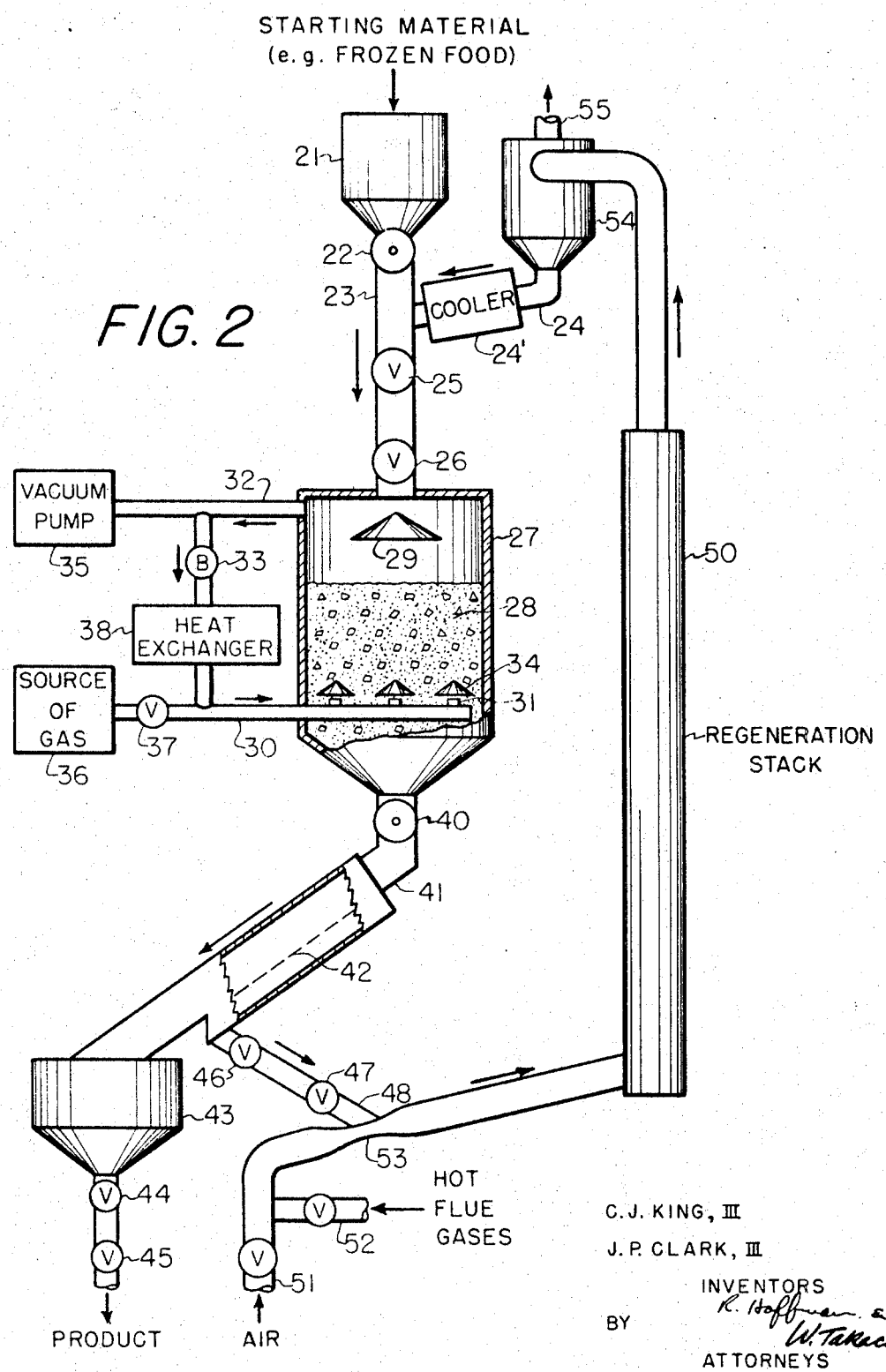

United States Patent Office 3,453,741
Patented July 8, 1969

3,453,741
SYSTEM FOR FREEZE-DRYING
Cary Judson King III, Kensington, and John Peter Clark III, Berkeley, Calif., assignors to the United States of America as represented by the Secretary of Agriculture
Filed Nov. 2, 1967, Ser. No. 680,154
Int. Cl. F26b 5/06, 21/14
U.S. Cl. 34—5    9 Claims

ABSTRACT OF THE DISCLOSURE

Process for freeze-drying wherein pieces of food or other material to be dried are frozen and placed in proximity to molecular sieve granules. A gas, preferably of low molecular weight, such as helium, is circulated through the system whereby to scavenge water vapor formed by sublimation of ice, to transport the water vapor to the molecular sieve for adsorption thereby, and to transfer heat generated by this adsorption to the material under treatment to supply heat required for sublimation.

---

This invention relates to and as among its objects the provision of novel processes for freeze-drying materials such as foods, biological substances, etc. The objects of the invention also include the provision of novel apparatus for conducting freeze-drying. Further objects of the invention will be evident from the following description and the appended drawings. Throughout the description, parts and percentages are by weight, unless otherwise specified.

In the drawing:

FIG. 2 is a diagrammatic view, partly in cross-section, of a modification of the invention particularly adapted for continuous operation.

Figure 1:
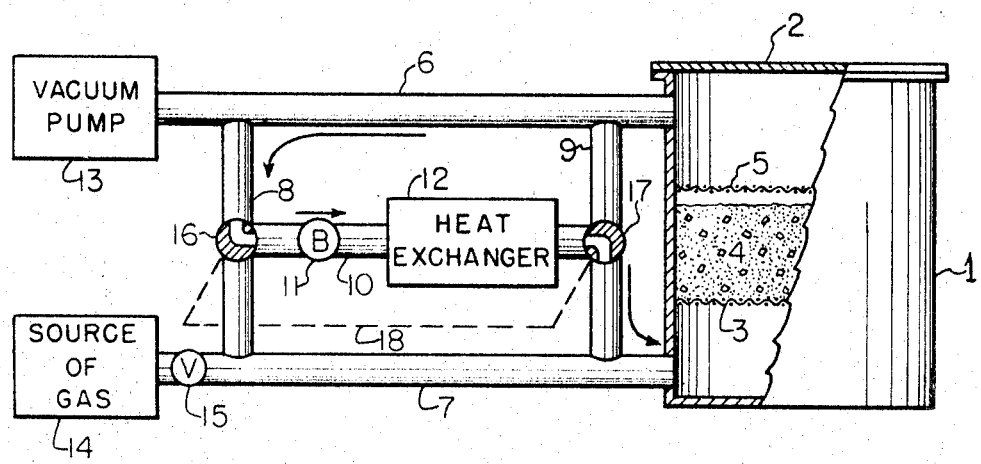
FIG. 1 is a diagrammatic view, partly in cross-section, of one modification of apparatus for practice of the invention.

The dehydration procedure generally designated as freeze-drying involves the following basic technique: The material under treatment is frozen, and, while maintained in the frozen state, is subjected to appropriate conditions to effectuate a sublimation of ice, that is, to cause the ice in the material to be directly transformed into water vapor. Conventionally, the appropriate conditions involve application of heat to the material being dried to compensate for the heat absorbed during sublimation (an endothermal change of state), and also application of a high vacuum whereby to remove water vapor from the system.

Typically, freeze-drying is conducted by a batch technique utilizing a conventional vacuum drier of the shelf type. Such driers include a sturdy cabinet provided with a door which may be sealed to a vacuum-tight condition. Within the cabinet are a series of hollow shelves through which a suitable heating medium such as steam or hot water may be circulated. In operation, the material to be dehydrated, for example, peas, strawberries, chicken pieces, etc., are placed on trays and frozen. The trays of frozen material are then slid onto the shelves of the drier, the door closed, and the interior of the cabinet evacuated. Heat is applied to the hollow shelves and the system is maintained under the appropriate conditions of vacuum and applied heat until the product is dehydrated. The freeze-drying procedure has certain advantages which render it desirable for dehydration of foods. Notable among these is that the products retain their original size and shape and have a porous texture so that they can be readily rehydrated. Another item is that there is a marked reduction in damage to such properties as flavor and color as compared with air-drying procedures.

Although the freeze-drying technique involves certain advantages, it is also subject to certain problems. A primary area of concern is that it is difficult to apply heat effectively. Since the system is under high vacuum, there is no medium available to carry heat to the particles of materials under treatment. Accordingly, it is necessary to apply heat by the use of radiant heaters, or, as described above, by contacting the particles with a hot surface. In both cases, the heat transfer is neither efficient nor uniform. For example, material close to the heat source loses moisture at a much faster rate than material which is isolated from the heat source, for instance, by a layer of the material under treatment. As a result, some portions of the product will be properly dehydrated (or even over-dehydrated or heat-damaged) while other portions will be inadequately dehydrated and may even contain residual particles of ice.

Another item is that the usual systems require application of high vacuums in order to remove water vapor as rapidly as possible. (Water vapor remaining in the particles of material or adjacent thereto impedes the rate of sublimation.) The necessity for applying a high vacuum entails, in turn, the provision of elaborate equipment for evacuating the system and for condensing moisture out of the evolved gases. This equipment not only involves considerable capital expense but also high operating costs because it has to operate continuously throughout the entire freeze-drying operation.

Because of the limitations on heat transfer and water vapor removal, the conventional procedures are slow. For example, dehydrating a batch of peas by freeze-drying will take anywhere from 2½ to 6 times as long as dehydrating the same produce in a current of hot air. To this must further be added the disadvantage of non-uniformity of moisture content from piece to piece. Invariably, the usual freeze-dried product will contain substantial portions of over-dried (heat-damaged) and under-dried material.

The present invention has as its prime object the provision of procedures which surmount the problems outlined above.

In the freeze-drying system of the invention the material under treatment is intimately contacted with a stream of gas. This gas provides several benefits. It acts as a heat-transfer medium to convey to the material the heat needed to drive the sublimation. Moreover, it achieves heat-transfer effectively and uniformly by contacting all the surfaces of the particles of material and, it is believed, even by penetrating into the particles to carry heat directly into the loci where sublimation of moisture is taking place. Such a uniform application of heat by the use of a gaseous agent is in sharp contrast with the localized hot and cold spots that prevail with conventional radiant or surface contact heating systems.

The steam of gas also functions as a scavenging agent. It sweeps evolved water vapor away from the particles under treatment. This sweeping or scavenging action is effective not only at the surfaces of the particles but also in the interstices between individual particles. Indeed, it is believed that the gas penetrates into the particles to the very sites where sublimation is taking place and drives out the water vapor formed therein. The net result of this effective scavenging action is that the rate of sublimation is substantially increased. Considering the equation—

$$H_2O \text{ (solid)} \rightarrow H_2O \text{ (vapor)}$$

it is evident that a rapid removal of the product (water vapor) from the field of action promotes the desired transformation of ice into water vapor.

In a preferred embodiment of the invention as applied on a batch scale to deep beds of material, the direction of the gas flow is periodically changed, for example, it is alternately directed upwardly and downwardly through the bed. This action enhances uniformity of dehydration. However, where the process of the invention is applied to thin beds, such reversal of flow is not critical, though it can still be employed. In operating in a continuous manner, reversal of the gas flow is not required because all particles necessarily travel through the system counter to the flow of gas so that all particles are subjected to identical conditions of temperature, pressure, etc.

Various gases may be used in the dehydration in accordance with the invention. An obvious item is that the gas should be non-reactive with the material under treatment and in application to foods or the like, be of a non-toxic character. Typically, one may use nitrous oxide, nitrogen, carbon dioxide, helium or other of the so-called inert gases, methane, hydrogen, or fluorocarbons such as difluoromethane, trifluoromethane, tetrafluoromethane, etc. Ordinary air may also be employed, but is not a preferred example in the treatment of materials which contain oxidation-labile components. However, it is completely suitable in conjunction with materials which are not susceptible to oxidation. A preferred embodiment of the invention involves the use of a gas of low molecular (or atomic) weight such as hydrogen or helium, the latter being preferred because it is noninflammable. The significance in the use of such light gases lies in the fact that they display both a high thermal conductivity and a high diffusivity. As a result, they enhance the transfer of heat to the material under treatment and also enhance the scavening of water vapor. Our studies have investigated that the use of helium will yield a drying rate about 2 to 3 times that attained with nitrogen under otherwise identical conditions.

Another feature of the invention is that molecular sieve particles are maintained in proximity to the material under treatment—for example, the granules of the molecular sieve may be disposed near, or in actual contact with, the pieces of food or other material under treatment. By providing this proximal relationship, various important advantages are secured:

The molecular sieve not only takes up water vapor evolved in the sublimation but also does so close to the site where the water vapor is evolved. For example, as water vapor issues from an individual piece of food it meets a nearby granule of molecular sieve and is adsorbed thereby, i.e., the water vapor is not only removed from the field of action but also it is removed before it can interfere with sublimation of ice from another individual piece and/or cause remoistening of a dried area of another piece. In sum, the presence of the molecular sieve, and particularly its location near the material under treatment, enhances the rate of sublimation and contributes to uniform dehydration of individual units of the material under treatment. It is further evident that the gas stream and molecular sieve granules act in concert to enhance both sublimation rate and uniformity of dehydration. Thus, the gas stream drives the evolved water vapor out of individual pieces of material and transports it to the molecular sieve granules. The gas is thereby dried and in prime condition for repetition of the same action.

A very important benefit of the molecular sive is that it assists in supplying the heat required to drive the sublimation. Thus, as water is taken up by the molecular sieve, heat is released. Because of the proximity of the molecular sieve to the material, this heat is transferred to the material by conduction (through direct contact), and through the medium of the gas stream, i.e., the heat is imparted to the gas and then by the latter to the pieces of material in the system.

In conventional freeze-drying systems, high vacuums are used, namely, those corresponding to an absolute pressure of 1 mm. Hg or less, usually less than 50 microns. Also, the evacuation equipment must operate continuously during the run and must evacuate water vapor from the system as well as any fixed gases which enter the system. This, as noted above, necessitates elaborate and costly equipment and high operating expenses. In the process of the invention, the system is operated at what may well be termed as a moderate vacuum, that is, a pressure of about 10 to 100, preferably 25 to 75 mm. Hg absolute. Vacuums of this order are easy to attain and only relatively inexpensive equipment is needed. Moreover, in the system of the invention there is no need to evacuate water vapor—this is absorbed within the system by the molecular sieve. Accordingly, the vacuum equipment may be of much smaller capacity than in a conventional system. Moreover, the vacuum equipment need not be operated continuously. For example, in batch operations the system is exhausted only at the beginning of the run. This establishes the pressure at the desired level, and thereafter the vacuum equipment may be shut down. Moreover, even when the process of the invention is conducted on a continuous basis, the vacuum equipment need only be operated as necessary to withdraw any excess fixed gas which enters the system—for example, entrained with the incoming raw material. Moreover, even in such case only fixed gases are evacuated; water vapor is trapped within the dehydration zone by the molecular sieve. It will be obvious from the foregoing that the invention provides substantial economic advantages, both in initial equipment costs and in expenses for operation. Moreover, there is no sacrifice in efficiency. Our investigations on the effect of pressure in freeze-drying have shown that high pressures favor heat transfer while impeding water vapor removal (through decreased diffusivity of the gas), whereas low pressures have just the opposite effect—heat transfer is impeded while water vapor removal is enhanced. As a consequence, the rate of drying is low at both low pressures and high pressures. However, we have found that intermediate pressures in the range of about 25–75 mm. Hg provide the best balance between heat transfer and water vapor removal whereby optimum rates of dehydration are achieved.

The substances commonly known as molecular sieves are aluminosilicates or zeolites, the crystals of which contain minute pores. In fact, the cross-sections of these pores are of molecular dimensions. As a result, they can be used to separate mixtures of gases or liquids by making use of the differences in size and shape of the molecules in the mixture. A particularly useful aspect of the molecular sieves is their ability to separate water vapor from its mixtures with fixed gases such as nitrogen, air, helium, hydrogen, etc. When a gas stream containing these components is contacted with the crystals, the water vapor is trapped within the crystals, whereas the fixed gases pass through or by the crystals. The molecular sieves exhibit a very high capacity for water. In general, a molecular sieve will adsorb five times as much water as will conventional desiccants such as silica gel or activated alumina. As the molecular sieve, one may employ natural zeolites or synthetic zeolites. The preparation of synthetic zeolites is known and forms no part of the present invention; indeed, they are commercial products available on the open market. The molecular sieves not only exhibit a high capacity for absorbing water but also do so with retention of their original form and without oozing any liquid or becoming sticky. These characteristics make the molecular sieves of outstanding value for the process of the invention—there is no contamination of the material under treatment, and, even where the molecular sieve and material under treatment are initially admixed, the dried product can be readily separated from the hydrated molecular sieve granules.

The temperature at which the dehydration is conducted may be varied. An obvious point is that the temperature should be as high as possible (to expedite the sublimation of ice) but not so high as to thaw the frozen material or cause it to shrink, become sticky, or scorch it. In general, the gas can be applied at temperatures well above the freezing point since the particles will not assume the temperature of the gas stream, due to the boundary effects and absorption of heat as ice is sublimed. Accordingly, it is preferred that the gas stream entering the system be at least at room temperature (25° C.) and usually it is at about 50–60° C.

A typical application of the invention will next be explained in connection with FIG. 1 in the annexed drawing.

Referring to FIG. 1, numeral 1 designates a dehydration chamber provided with a removable lid 2. Within chamber 1 is a foraminous platform 3, made of wire cloth, perforated sheet metal, or the like, which supports bed 4—a mixture of molecular sieve granules and frozen pieces of food or other material to be dried. A removable screen 5 is disposed over a bed 4 to prevent particles from entering the piping system during operation.

For circulation of gas through bed 4 there are provided pipes 6, 7, 8, 9, and 10 and blower 11. Interposed in pipe 10 is heat exchanger 12 whereby the stream of gas can be maintained at a predetermined temperature, by applying heating or cooling as necessary.

Also connected into the gas recirculation system are vacuum pump 13 and gas source 14.

The gas recirculation system also includes means whereby the gas stream can be directed upwardly or downwardly through bed 4. This means includes 2-way valves 16 and 17. The broken line designated by numeral 18 represents a linkage between valves 16 and 17, permitting their operation together, either manually or by a timer mechanism. In the position shown in FIG. 1, the gas stream is impelled by blower 11 through heat exchanger 12 into pipe 7 and then into the base of chamber 1. The return flow is via pipes 6 and 8 back to the blower. By suitable rotation of valves 16 and 17, the flow is reversed, i.e., from blower 11, through heat exchanger 12, into pipe 6 and then into the upper portion of chamber 1. The return flow is via pipes 7 and 8 to blower 11.

In starting a run, frozen pieces of food or other material to be dried are mixed with molecular sieve granules, using at least enough of the latter to take up the amount of water to be removed from the food. The mixture is deposited on platform 3. Screen 5 is placed over the bed and top 2 is put in place to seal chamber 1 from the atmosphere. (Conventional sealing and fastening means are provided in practice. These are not illustrated in the figure, which is of a schematic nature.) Vacuum pump 13 is actuated for a period long enough to substantially exhaust chamber 1 and the appurtenances communicating therewith. Pump 13 is then shut off and remains off during the run. Valve 15 is opened to invest the system with gas—preferably, a low molecular weight gas such as helium—from pressure source 14. When the pressure of gas in the system reaches a level of about 25 to 75 mm. Hg absolute, valve 15 is closed and kept closed during the run. Blower 11 is now turned on to circulate gas through bed 4, circulation being continued until the material is dried to the desired degree. Also during the run, the positions of valves 16 and 17 are periodically changed to alternately direct the gas upwardly and downwardly—this ensures a uniform dehydration effect. Blower 11 is operated at such a speed that the gas flows through bed 4 at a rate which will effectuate the desired transfer of heat and scavenging of water vapor. However, the flow is not so high as to effect a fluidization of the material in bed 4. Procedures have been advocated wherein freeze-drying is accomplished by fluidization of the particles undergoing dehydration. We have found that fluidization is neither necessary or desirable as it is deleterious to the material under treatment by causing attrition of the particles, i.e., it causes corners and edges of the material to be ground off, producing fine material of little commercial value. In the process of the invention bed 4 remains in a static condition whereby attrition is avoided and at the same time rapid and uniform dehydration are achieved through the coaction of the circulating gas and the molecular sieve.

During the operation, heat exchanger 12 is activated to provide heating or cooling as necessary to maintain the gas stream at a predetermined temperature. Generally, it is preferred to have the gas stream at as high a temperature as possible without thawing the frozen material or causing it to shrink or become sticky.

After the material has been dried to the desired extent, chamber 1 is opened and bed 4 is removed and subjected to a screening or equivalent operation to separate the pieces of dried material from the molecular sieve granules.

Reference is made to FIG. 2 wherein is illustrated a modification of the invention which utilizes a moving, or continuously-renewed, bed.

The material to be dried—for example, diced chicken, peas, or diced carrots—is contained in hopper 21. The material is in a frozen state, and hopper 21 may be provided with thermal insulation or even cooling jackets, coils, or the like, so that the food pieces are maintained at a subfreezing temperature. Reference numeral 22 designates a star-wheel feeder, or similar metering device, which feeds the frozen food pieces into conduit 23 at a predetermined rate.

Concurrently, molecular sieve granules flow from duct 24 into conduit 23 whereby they mix with the frozen food pieces contained therein. The rates of entry of the molecular sieve granules and the frozen food pieces are so correlated that the amount of molecular sieve granules is at least the amount necessary to take up the proportion of water to be removed from the coentering allotment of food pieces. The resulting mixture descends through valves 25 and 26 into drying chamber 27. As explained hereinafter, this chamber is operated at a subatmospheric pressure, and the pair of valves 25 and 26 function as a conventional vacuum lock, i.e., the individual valves are operated in sequence to prevent air from getting into drying chamber 27. (The total system includes several other pairs of valves which function in similar manner, and the manner in which they are operated will be evident from the above explanation.)

The mixture of frozen food pieces and molecular sieve granules descending into chamber 27 forms a bed 28 therein. Cone 29 is provided to assist in spreading the incoming stream of material. It is obvious that in place of cone 29, one could use a rotating or oscillating spreading device, or the like.

A current of gas is recirculated through bed 28 via pipe 30, nozzles 31, pipe 32, and blower 33. Also in the circuit is heat exchanger 38 which is operated as necessary, in a heating or cooling cycle, to maintain the incoming gas at a predetermined temperature level. Conical hoods 34 are provided to prevent particles from choking nozzles 31. The pressure within chamber 27 is maintained at about 25–75 mm. Hg by operation of vacuum pump 35 as required. It is obvious that in continuous operation, some air will necessarily enter with the material fed into the chamber from conduit 23, and pump 35 will need to be operated at intervals to remove this air. It is to be emphasized that vacuum pump 35 is of relatively small capacity since it functions only to remove fixed gases from the system. Water vapor is absorbed by the molecular sieve granules. In general, it is preferred to use helium, hydrogen, or nitrogen as the recirculating gas, and during operation makeup gas may be bled into the system from source 36 (via valve 37) from time to time as necessary.

During the operation the material of bed 28 is continuously renewed. Dried material moves downwardly toward the base of chamber 27 while fresh material enters at the top as explained above. It is, of course, obvious that the rate of feeding and the rate of withdrawal of product are correlated to maintain bed 28 at about a constant volume, and that the conditions of dehydration are so controlled that the product is properly dehydrated in its passage through chamber 27.

Reference numeral 40 designates a star-wheel feeder, or equivalent metering device, which is operated at an appropriate rate to retain material in chamber 27 long enough to attain proper drying and to discharge the dried product into conduit 41. This conduit directs the dried product onto screen 42. The dried food pieces being of larger size remain on the screen and descend into hopper 43, from which they may be removed via valves 44 and 45 which coact as a vacuum lock. The molecular sieve granules drop through sieve 42 and are discharged via valves 46 and 47 (these coacting as a vacuum lock) into conduit 48 and then into a regenerating (drying) system.

The regenerating system includes a stack (or air-lift drier) 50 into which is directed a stream of air via conduit 51 at a rate sufficient to lift the granules through the stack. Concomitantly, hot combustion flue gas is introduced from pipe 52 so that the air stream will also be hot enough to effect a regeneration (drying) of the molecular sieve granules. As the hot air stream flows through throat 53 the granules are sucked into the stream (from conduit 48) and are propelled through stack 50 where the desired regeneration takes place. The gases and entrained dried granules then enter cyclone 54. The gases are discharged through vent 55; the dried granules drop into conduit 24, pass through cooler 24′, and are available for reuse in the drying cycle.

Figure 3:
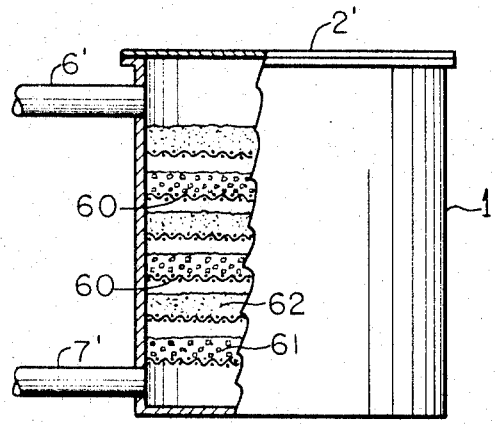
FIG. 3 is a fragmentary view illustrating another modification of the invention.

Reference is now made to FIG. 3 which depicts a modified form of the apparatus wherein the material to be dried and the molecular sieve are maintained in separate strata. In FIG. 3, various parts which correspond to those in FIG. 1 are designated by the same reference numeral with a prime sign affixed thereto—e.g., the element denoted 6′ in FIG. 3 corresponds to element 6 in the device of FIG. 1.

The device of FIG. 3 includes a drying chamber 1′ provided with a series of removable foraminous shelves 60 made of wire-screening, perforated sheet metal, or the like. In operating the device, shelves 60 are loaded to provide alternate layers of frozen material 61 and molecular sieve granules 62. For best results these layers are relatively thin—on the order of ⅛ to ½ inch in depth. After loading, lid 2′ is sealed shut and gas is circulated through the system via ducts 6′ and 7′ as disclosed above in connection with the modification of FIG. 1. After completion of the drying the individual shelves 60 are lifted out one by one. The system of FIG. 3 eliminates the need for screening to separate the product and sieve particles. However, it is not a preferred embodiment of the invention because the vapor paths are substantially longer than where the sieve granules are mixed with the food pieces and accordingly the drying rate is lower than attained in the device of FIGS. 1 or 2.

The invention may be utilized for the dehydration of all kinds of materials, typical examples being fruits, vegetables, meats, cheeses and other dairy products, cereals, and biological products such as animal organs, tissue, etc. For proper operation the material should be in particulate form. Thus with larger products, such as carrots, potatoes, apples, poultry, fish, beef, etc., these are reduced to particulate form by application of conventional operations, such as chopping, dicing, or slicing. The smaller materials—e.g., beans, peas, grapes, berries, cereals, etc.—can be applied to the dehydration as such. As customary in freeze-drying procedures, the material is first frozen, then applied to the dehydration procedure of the invention while in the frozen state. Also, because of the solidifying effect of freezing, the invention may be used for dehydration of liquid materials such as milk; eggs; and juices, extracts, purees, or concentrates derived from fruits, vegetables, meats, or cereals. In such applications, the liquid raw material is frozen in the form of globules, pellets, tablets or other appropriate particles and applied in such form to the dehydration process.

In the preferred embodiment of the invention, the frozen pieces of food or other material are mixed with the molecular sieve granules. This technique obviously requires that the mixture, after dehydration, be separated into its original components. Usually, this is done by screening and, accordingly, the sizes of the individual components should be selected to facilitate such action. Generally, it is preferred that the pieces of material be the larger of the two, although it is obvious that a reverse system can be employed. Morever, in the event that a separation procedure other than screening is used, the respective sizes of the components may be ignored. For example, separation techniques based upon difference in density or electrostatic properties may be used, or the molecular sieve granules may be pretreated with a small percentage of a magnetic substance (magnetite, for example), in which case the mixture after dehydration can be separated by application of conventional magnetic segregation techniques.

The invention is further demonstrated by the following example.

Frozen carrot dice were dehydrated in apparatus as shown in FIG. 1. Bed 4 was approximately 4 inches deep, consisting of 1 part of frozen 5/16 inch carrot dice (moisture content 84.5%) and 10 parts of commercial molecular sieve material in the form of spheres about ⅛ inch in diameter (Linde molecular sieve, type 4A). The upper and lower ½ inch of the bed were composed of molecular sieve spheres, the middle 3 inches was a uniform mixture of the carrot dice and molecular sieve spheres. Helium gas was circulated through the bed at a superficial velocity of 2.1 ft./sec. and a pressure of 45±2 mm. Hg for the time of the run (2 hours). During the run some refrigeration was applied to the gas stream at a point away from the bed to make up for heat leaks in from the atmosphere. However, no attempt was made to hold the gas temperature constant; it was allowed to rise during the run. The temperature of the gas entering the bed and the temperature of the center of a carrot piece located 1 inch below the top of the bed were both monitored by thremocouples. The temperature history of the run is shown in the following table:

|  | Temperature, ° C. | |
| --- | --- | --- |
|  | Gas | Carrot piece |
| Time, min.: |  |  |
| 0 | −10 | −40 |
| 15 | 0 | −15 |
| 30 | 8 | −10 |
| 60 | 17 | −5 |
| 90 | 20 | −2 |
| 120 | 22 | +7 |

At the end of the run the material in the bed was removed and the dried carrot dice were easily separated from the molecular sieve spheres by screening. The dehydrated dice had a residual moisture content of 4% and were of good quality as to both color and flavor.

Having thus described the invention, what is claimed is:

1. Apparatus for freeze-drying material which comprises, in combination:

(a) a drying chamber, (b) means within the drying chamber for retaining a bed of frozen pieces of material mixed with molecular sieve granules, (c) means for circulating a gas through said bed, and (d) means for alternately circulating said gas upwardly and downwardly through said bed.

2. Apparatus for continuous freeze-drying of material which comprises, in combination:

(a) a drying chamber, (b) means for feeding frozen material and molecular sieve granules into the drying chamber, (c) means for circulating a gas through the frozen material and molecular sieve granules,
(d) means for withdrawing dried material and spent molecular sieve granules from the drying chamber,
(e) means for separating the dried material from the spent molecular sieve granules,
(f) means for regenerating the spent molecular sieve granules, and
(g) means for recycling said regenerated granules back to the drying chamber.

3. A process for freeze-drying which comprises
(a) mixing frozen pieces of material to be dried with molecular sieve granules,
(b) circulating a gas through the mixture of frozen pieces of material and molecular sieve granules, whereby to scavenge water vapor formed by sublimation of ice, to transport the water vapor to the molecular sieve granules for adsorption thereby, and to transfer heat generated by this adsorption to the pieces of material to supply heat required for sublimation,
(c) continuing the circulation of gas until the pieces of material are dry, and
(d) separating the dry pieces from the molecular sieve granules.

4. The process of claim 3 wherein the gas is at a pressure of about 25 to 75 mm. Hg.

5. The process of claim 3 wherein the gas is at a temperature of about 25° to 60° C.

6. The process of claim 3 wherein the rate of circulation of gas is limited so that the mixture of frozen pieces and molecular sieve granules is in a static condition.

7. The process of claim 3 wherein the gas is helium.

8. The process of claim 3 wherein the gas is hydrogen.

9. The process of claim 3 wherein the gas is nitrogen.

References Cited

UNITED STATES PATENTS

| | | | |
|---|---|---|---|
| 2,388,134 | 10/1945 | Flosdorf | 34—5 |
| 2,897,600 | 8/1959 | Graham et al. | 34—5 |
| 3,031,381 | 4/1962 | Laugerhaus | 34—5 |
| 3,096,163 | 7/1963 | Meryman | 34—5 |
| 3,313,032 | 4/1967 | Malecki | 34—5 |

WILLIAM J. WYE, *Primary Examiner.*

U.S. Cl. X.R.

34—191, 92